United States Patent [19]

Sandiford

[11] 4,332,297
[45] Jun. 1, 1982

[54] SELECTIVELY CONTROLLING FLUID FLOW THROUGH THE HIGHER PERMEABILITY ZONES OF SUBTERRANEAN RESERVOIRS

[75] Inventor: Burton B. Sandiford, Placentia, Calif.

[73] Assignee: Union Oil Company of California, Brea, Calif.

[21] Appl. No.: 178,911

[22] Filed: Aug. 18, 1980

[51] Int. Cl.$^3$ .................... E21B 33/138; E21B 43/22
[52] U.S. Cl. .................................. 166/270; 166/246; 166/273; 166/294
[58] Field of Search ............... 166/295, 294, 270, 273, 166/274, 246

[56] References Cited

U.S. PATENT DOCUMENTS

| | | | |
|---|---|---|---|
| 3,288,230 | 11/1966 | Braunlich, Jr. et al. | 175/72 |
| 3,396,790 | 8/1968 | Eaton | 166/270 |
| 3,421,584 | 1/1969 | Eilers et al. | 166/295 |
| 3,701,384 | 10/1972 | Routson | 166/292 |
| 3,741,307 | 6/1973 | Sandiford et al. | 166/292 X |
| 4,009,755 | 3/1977 | Sandiford | 166/270 |
| 4,069,869 | 1/1978 | Sandiford | 166/270 |
| 4,140,183 | 2/1979 | Holm | 166/295 X |

*Primary Examiner*—Stephen J. Novosad
*Attorney, Agent, or Firm*—Dean Sandford; Gerald L. Floyd

[57] ABSTRACT

A method for restricting fluid flow in depth outwardly from the bore hole through the medium to high permeable zones of a subterranean reservoir of nonuniform permeability in which there is injected into the reservoir aqueous solutions of a water-soluble polymer and an alkali metal silicate. The injected solutions are either admixed at the surface prior to injection, simultaneously injected or injected sequentially.

29 Claims, No Drawings

SELECTIVELY CONTROLLING FLUID FLOW THROUGH THE HIGHER PERMEABILITY ZONES OF SUBTERRANEAN RESERVOIRS

BACKGROUND OF THE INVENTION

1. Field of the Invention

This invention relates to a method for restricting fluid flow through the medium to high permeable strata of subterranean reservoirs having heterogeneous permeability at a substantial depth outwardly from a bore hole. More particularly, the invention relates to such a method to provide better control of fluids subsequently injected into a reservoir during enhanced oil recovery operations or withdrawn from a reservoir during production operations.

2. Description of the Prior Art

When fluids flow through reservoirs having sections of varying permeability, a higher percentage of the fluids tends to flow through those sections having a higher permeability. It is often desired to decrease or stop the flow of fluids through these sections of higher permeability.

For example, in the enhanced recovery of petroleum by flooding, a displacing fluid is injected into the reservoir via one or more injection wells to displace the petroleum through the reservoir toward one or more producing wells.

In the normal flooding operation, maximum oil recovery is obtained when the driven fluid builds up in a wide band in front of the driving fluid which moves uniformly towards the producing well. To keep this bank of oil intact, and constantly moving towards the producing well, a substantially uniform permeability must exist throughout the reservoir. If this uniform permeability does not exist, or is not provided, the flooding fluid will follow the path of least resistance, pass mostly through the portions of the reservoir having the highest permeability and bypass the petroleum present in the less permeable portions of the reservoir. This results in the loss of some driving fluid energy and the early appearance of excessive amounts of driving fluid at the producing well. If fluid flow through these high permeability zones of the reservoir was restricted or they were plugged, the injected fluid would be forced to flow into the less permeable portions of the reservoir and displace a higher percentage of the petroleum present in the entire reservoir. Similarly, in the production of oil, producing wells sometimes produce water and/or gas along with oil. The water and gas often are produced through the portions of the reservoir having a relatively high permeability. If the zones through which water and gas are produced could be at least partially plugged, a higher percentage of the produced fluids would be the desired oil phase.

A wide variety of materials have been proposed for use in plugging subterranean reservoirs. It is known to inject an aqueous solution of a water-soluble polymer and a cross-linking agent which reacts in the reservoir to form a plug. Similarly, plugs have been formed using aqueous solutions of sodium silicate and a gelling agent therefor. U.S. Pat. No. 4,069,869 to Sandiford described a method for forming a mixed plug in a reservoir by injecting aqueous solutions of: (1) a polymer such as polyacrylamide, polysaccharide or a cellulose ether, (2) a cross-linking agent such as sodium dichromate which reacts with the polymer to form a time-delayed polymer-containing plug, (3) an alkali metal silicate such as sodium silicate, and (4) a gelling agent such as ammonium sulfate which reacts with the silicate to form a silicate-containing plug. The injected compositions are either admixed at the surface or injected simultaneously. U.S. Pat. No. 4,009,755 to Sandiford discloses a method for forming a combination plug using materials similar to those described in the previous Sandiford patent wherein there is injected into a reservoir aqueous solutions of a polymer and a cross-linking agent which react to form a first plug followed by an aqueous solutions of an alkali metal silicate and a gelling agent which react to form a second plug.

The various plug-forming compositions and methods previously suggested have met with some success, especially in reducing fluid flow through the highest permeability channels of heterogeneous reservoirs which require formation of a very stiff gel or solid, i.e., the type of plug best provided by a plug-forming composition including either a cross-linking agent or a gelling agent. However, need remains for even more effective methods for forming plugs, especially in reservoirs having channels or zones of high to medium permeability where a very stiff gel or solid plug is not required or sometimes not even desired. A stiff gel or solid plug may adequately plug a portion of a very high permeability channel, but, after formation, the plug has little ability to continue to move or flow and may be bypassed by other low viscosity fluids flowing through the reservoir. Thus, it has been difficult to form in the higher permeability channels of a reservoir a material which restricts fluid flow through that portion of the reservoir, but which fluid flow-restricting material remains capable of at least limited flow itself when occupying a channel to which a pressure differential is applied so that it is not so easily bypassed by other fluids.

One especially troublesome type of reservoir of heterogeneous permeability in which to carry out enhanced recovery operations is one in which any injected treating fluid, such as a plug-forming composition, takes a relatively long period of time to travel from an injection well to a production well. Travel time can be as long as one month, two months or even longer. High permeability channels often exist over the entire distance between wells. Plug-forming compositions containing cross-linking agent and/or a gelling agent tend to form plugs within a relatively short period of time, as within 24 hours after being injected. Also many cross-linking agents and gelling agents exhibit a tendency to adsorb onto reservoir rock so that such compositions which have passed through the reservoir only a limited distance away from the injection bore hole become partially, substantially or completely depleted of cross-linking agent or gelling agent. Thus, due to several factors it is difficult to form a plug a substantial distance from the injection bore hole.

Accordingly, a principal object of this invention is to provide a method for controlling the permeability of a subterranean formation of nonuniform permeability.

Another object of the invention is to provide a method for reducing channeling of a flooding medium from an injection well to a producing well via a zone of high to medium permeability.

Still another object of the invention is to provide a method for selectively restricting fluid flow through water-producing and gas-producing zones in a subterranean reservoir.

A further object of the invention is to restrict fluid flow through the higher to medium permeability zones of a reservoir at a substantial distance from the injection bore hole.

A still further object of the invention is to achieve an in depth restriction of fluid flow through the medium to high permeability zones of a reservoir.

Other objects, advantages and features of the invention will become apparent from the following description and appended claims.

SUMMARY OF THE INVENTION

A method for restriction fluid flow through the zones of a subterranean reservoir penetrated by a well having medium to high permeability, especially at a substantial depth away from the bore hole in such reservoirs, to control the path of flow of fluids through the reservoir in which there is injected or introduced into the reservoir an aqueous solution or dispersion of a water-soluble polymer and an aqueous solution or dispersion of an alkali metal silicate. The components are injected in a manner such that they are or become mixed when in the reservoir, i.e., they are either premixed at the surface prior to injection, injected simultaneously or injected sequentially.

DETAILED DESCRIPTION OF THE INVENTION

When an enhanced oil recovery fluid is injected into a reservoir it is desired that it pass therethrough in as uniform a manner as possible. In reservoirs having heterogeneous permeability, such fluid tends to flow primarily through the more permeable flow channels, finger through the reservoir and largely bypass the less permeable strata which may make up the bulk of the reservoir and contain a large proportion of the oil which it is desired to displace. Thus, prior to the injection of the enhanced oil recovery fluid, it is desired to restrict fluid flow through or plug those more permeable flow channels so that such recovery fluid, when introduced, will have more of a tendency to travel through and displace oil from the less permeable strata. Due to the complex nature of reservoirs encountered, there are a wide variety of heterogeneous permeability conditions with which to deal. In order to restrict fluid flow through channels of very high permeability, it is generally necessary to utilize a treating agent which will form a very stiff gel or solid. Plug-forming compositions made up of a polymer together with a cross-linking agent and/or an alkali metal silicate together with a gelling agent are often employed in such situations. For channels which are only slightly higher in permeability than the rest of the reservoir, an aqueous polymer solution often provides enough effect on fluid flow to even out flow of an enhanced oil recovery fluid therethrough. Need remains for a more effective method for restricting fluid flow through channels having a permeability between those having a very high permeability and those having a permeability only slightly higher than the rest of the reservoir. Broadly, these channels of so-called medium permeability have a permeability of about 50 to 1,000 millidarcys. Since these more permeable flow channels often exist throughout the entire segment of the reservoir penetrated by the recovery fluid, it is desirable to form the plug over the entire segment, i.e., the plug-forming composition must be capable of restricting fluid flow or plugging the reservoir throughout the segment as well as in the immediate vicinity of the well bore. Many present day polymer plugging treatments are designed to form a plug up to 25 feet away from the injection well. Following the method of this invention, the fluid flow through the reservoir can be restricted at a depth of more than 25 feet from the well e.g., 35 to 100 feet or more.

It has been found possible to carry out such an operation to restrict fluid flow by injecting into the reservoir an aqueous solution of a water-soluble polymer and an aqueous solution of an alkali metal silicate. When mixed, these compositions form a high viscosity fluid composition having some slight evidence of a gel structure which, when occupying a flow channel, restricts flow of another fluid therethrough, even though substantially free of a cross-linking agent and a gelling agent which have previously been employed. By controlling the concentration of the polymer and the silicate, the flow restriction can be made to occur at any desired time, e.g., at any time after injection into the reservoir. By the proper selection of concentration of components and injection procedures, the fluid flow restricting mixture can be made to become effective at times of two weeks to two months or more after injection into the reservoir.

The flow-restricting mixture can be prepared in any of a number of ways. The polymer and alkali metal silicate can be admixed with water or brine in any order at the surface. An aqueous solution of the polymer and an aqueous solution of the alkali metal silicate can be prepared separately and mixed before being injected down a well conduit. The polymer and alkali metal silicate can be blended into water or brine as the latter is being injected down a well conduit. The separately prepared aqueous solutions can be injected simultaneously down a well so that they mix as they travel down the well conduit. Alternatively, the separately prepared mixtures can be injected down the well conduit sequentially in any order so that they contact each other and mix after they have entered and are passing through the reservoir.

The aqueous polymer solution employed in the treatment of this invention is a dilute solution of a water-soluble or water-dispersible polymer in fresh water or brine. A number of water-soluble polymers are known to form viscous aqueous polymer solutions when dissolved therein in relatively dilute concentrations. Exemplary water-soluble polymeric materials that can be employed are relatively high molecular weight acrylic acid-acrylamide copolymers; polyacrylamides; partially hydrolyzed polyacrylamides; terpolymers of acrylamide and substituted acrylamides, such as acrylamide polymerized with various combinations of N,N'-methylenebisacrylamide, N-tert-butylacrylamide, methylolacrylamide and N-isopropylacrylamide, and terpolymers of acrylamide, acrylic acid and acrylonitrile; polyalkleneoxides and heteropolysaccharides obtained by the fermentation of starch-derived sugar.

Many of the water-soluble polymers useful in the practice of this invention are characterized by a viscosity of at least 3 centipoises for a 0.1 percent by weight solution thereof in aqueous 3 percent by weight sodium chloride solution at 25° C. as determined with a Brookfield viscometer equipped with a UL adapter and operated at a speed of 6 r.p.m. However, it is to be recognized that other of the water-soluble polymers, such as certain polyacrylamides and polyalkyleneoxides, are effective in reducing the mobility of water in porous media, yet have little or only slight effect upon the viscosity of water or brine.

The polyacrylamide and partially hydrolyzed polyacrylamide which can be used in this invention include the commercially available, water-soluble, high molecular weight polymers having molecular weights in the range of above about $0.2 \times 10^6$, preferably from $0.5 \times 10^6$, and more preferably from $3 \times 10^6$ to $10 \times 10^6$. The hydrolyzed polyacrylamides have up to about 70 percent of the carboxamide groups originally present in the polyacrylamide hydrolyzed to carboxyl groups. Preferably from about 12 to about 45 percent of the carboxamide groups are hydrolyzed to carboxyl groups. Hydrolysis of the acrylamide is accomplished by reacting the same with sufficient aqueous alkali, e.g., sodium hydroxide, to hydrolyze the desired number of amide groups present in the polymer molecule. The resulting products consist of a long hydrocarbon chain, with some carbon atoms bearing either amide or carboxyl groups. Copolymerization of acrylic acid and acrylamide according to well known procedures produces acrylic acid-arylamide copolymers. The term "hydrolyzed polyacrylamide," as employed herein, is inclusive of the modified polymers wherein the carboxyl groups are in the acid form and also of such polymers wherein the carboxyl groups are in the salt form, provided that the salts are water-soluble. Alkali metal and ammonium salts are preferred. A number of polyacrylamides and partially hydrolyzed acrylamide polymers and acrylic acid-acrylamide copolymers suitable for use in this invention are commercially available; for example, WC-500 polymer marketed by Calgon Corporation of Pittsburgh, Pa., Pusher 700 polymer marketed by The Dow Chemical Company of Midland, Michigan, Q-41-F polymer marketed by Nalco Chemical Company of Oak Brook, Illinois and Cyantrol 940 polymer marketed by American Cyanamid of Wayne, N.J.

Especially useful in the practice of this invention are the partially cationic polyacrylamides, the partially anionic polyacrylamides and mixtures thereof. A partially cationic polyacrylamide is a nonionic polyacrylamide which contains a cationic co-monomer, such as an alkylene polyamine, a quaternary ammonium chloride or amine hydrochloride, for example trimethyl octyl ammonium chloride, trimethyl stearyl ammonium chloride, oleyl trimethyl ammonium chloride, oleyl amine diethylamine hydrochloride and dimethylaminopropylamine. A partially anionic polyacrylamide can be a nonionic polyacrylamide which has been partially hydrolyzed to convert some of the acrylamide groups to acrylic groups, the alkali metal salts of which are anionic. Introducing sulfate or sulfonate groups into the polyacrylamide molecule also imparts an anionic character to the molecule. Polymer 1160 is a 20 percent by weight cationic, 80 percent nonionic copolymer marketed by Betz Laboratories, Inc. of Trevose, Pa. Polymer 1120 and Hi Vis polymer are 35 percent anionic, 65 percent nonionic polyacrylamides which have been partially hydrolyzed to the extent of 35 percent. These polymers are also marketed by Betz Laboratories, Inc. Also suitable are cationic polymers N-Hance 210 and 220 and anionic polymers N-Hance 325 and 1031 marketed by Cort Company of Bartlesville, Oklahoma.

The operable polyalkeneoxides have molecular weights in the range of from about $10^5$ to about $10^8$, preferably from $10^6$ to $10^7$ and most preferably from $3 \times 10^6$ to $10 \times 10^6$. By "polyalkeneoxide" is meant herein any of the polymeric water-soluble resins prepared by homopolymerization of a single alkene oxide, for example ethylene oxide, propylene oxide or butylene oxide. It is preferred to employ the homopolymer of polyethylene oxide. This product is marketed by Union Carbide Chemicals Company of New York City, New York under the trademark "Polyox". Mixed polyalkeneoxides, made by heteropolymerization of more than one alkene oxide in either a random or block polymerization, may also be employed.

The heteropolysaccharides which may be used in carrying out the present invention are ionic polysaccharides produced by fermentation of carbohydrates by bacteria of the genus Xanthomonas. Examples of such heteropolysaccharides are those produced by Xanthomonas campestris, Xanthomonas begonia, Xanthomonas phaseoli, Xanthomomonas hederae, Xanthomonas incanae, Xanthomonas carotae and Xanthomonas translucens. Of these, ionic polysaccharide B-1459 is preferred. The polysaccharide B-1459 is prepared by culturing the bacterium Xanthomonas campestris NRRL B-1459, U.S. Department of Agriculture, on a well aerated medium containing commercial glucose, organic nitrogen sources, dipotassium hydrogen phosphate and various trace elements. Fermentation is carried to completion in four days or less at a pH of about 7 and a temperature of 28° C. Polysaccharide B-1459 is available under the trademark Kelzan MF marketed by Kelco Company of San Diego, CA. Production of this heteropolysaccharide is well described in Smiley, K. L. "Microbiol Polysaccharides—A Review," Food Technology 20 9:112–116 (1966), and Moraine, R. A., Rogovin, S. P. and Smiley, K. L. "Kinetics of Polysaccharide B-1459 Synthesis," J. Fermentation Technology 44, 311–312 (1966).

The selected water-soluble polymer is admixed with fresh water or brine to provide a relatively dilute aqueous solution of the polymer that exhibits a sufficiently reduced mobility when injected into the porous media to divert subsequently injected fluids to the less permeable channels. Preferably, the polymer is dissolved in fresh water since the mobility reduction effect of most of these polymers is inhibited by the presence of substantial quantities of dissolved salts. However, it is sometimes desirable to employ oil-field brine or other water containing relatively high dissolved salt contents, particularly where the reservoir into which they are to be injected is water-sensitive or where fresh water is not available. In most instances, the mobility of the water can be reduced to the desired level by the addition of about 0.001 to about 1 weight percent of the polymer, and satisfactory results can often be obtained by the addition of 0.05 to 0.15 weight percent of polymer.

The alkali metal silicate is employed in a dilute aqueous solution in fresh water or light brine, preferably fresh water. Sodium silicate is the most widely used silicate. The ratio of silica to sodium oxide in the silicate can vary within limits from about 1.5:1 to about 4:1 by weight. Preferably the ratio should be from about 3:1 to about 3.5:1. Potassium silicate can be used in place of sodium silicate, although the greater cost of potassium silicate limits its use. Mixtures of sodium silicate and potassium silicate are sometimes preferred because of the low viscosity of their aqueous solutions. Sodium silicate is usually marketed as a concentrated thick aqueous solution or as a powder. A dilute aqueous solution can be formed by mixing either form with additional fresh water or brine.

The concentration of alkali metal silicate in the flow-restricting solution can vary over a wide range. Less flow-restriction is achieved at the more dilute concentrations and costs are often excessive at higher concentrations. Thus, it is preferred that the alkali metal silicate concentration of the flow-restricting solution injected into the formation be between about 0.05 and 5 weight percent and preferably between about 0.1 and 1.5 weight percent.

The aqueous solutions of polymer used in the practice of this invention have a viscosity of about 5 to 100 centipoises. The aqueous solutions of alkali metal silicate employed have a viscosity of about 1.5 centipoises. It is sometimes desirable to inject these two compositions separately and have them mix in the reservoir. Since the flow rate of a solution through the reservoir depends in part on its viscosity, it is sometimes desirable to add a thickener to the aqueous solution of alkali metal silicate so that its viscosity approximately equals that of the aqueous solution of polymer. The two solutions then tend to flow through the reservoir at about the same rate and chances of their mixing are improved. Thus, it is optional to add to the aqueous solution of alkali metal silicate a cellulose ether thickening agent. The cellulose ether does not react with either the polymer or the silicate and thus does not assist in forming the plug. Generally from about 0.05 to 1 weight percent cellulose ether, preferably 0.1 to 0.3 weight percent, is an effective amount giving the required thickening effect.

In general, any of the water-soluble cellulose ethers can be used in the practice of the invention. Cellulose ethers which can be used include, among others; mixed ethers such as carboxyalkyl hydroxyalkyl ethers, e.g., carboxymethyl hydroxyethyl cellulose (CMHEC); hydroxyalkyl celluloses such as hydroxyethyl cellulose, and hydroxypropyl cellulose; alkylhydroxyalkyl celluloses such as methylhydroxypropyl cellulose; alkylcarboxyalkyl celluloses such as ethylcarboxymethyl cellulose; and hydroxyalkylalkyl celluloses such as hydroxypropylmethyl cellulose; and the like. Many of the cellulose ethers are available commercially in various grades.

The carboxy-substituted cellulose ethers are available as the alkali metal salt, usually the sodium salt. However, the alkali metal is seldom referred to and they are commonly referred to CMHEC, etc. In the above-described mixed ethers, it is preferred that the portion thereof which contains the carboxylate groups be substantial instead of a mere trace. For example, in CMHEC it is preferred that the carboxymethyl degree of substitution be at least 0.4. The degree of hydroxyethyl substitution is less important and can vary widely, e.g., from about 0.1 or lower to about 0.4 or higher. Hydroxyalkyl celluloses are preferred, particularly hydroxyethyl cellulose.

While the volume of flow restricting fluid mixture to be employed in treating a reservoir can vary widely depending on the nature of the reservoir, generally a mixture containing about 1 to 100 barrels per vertical foot of strata to be treated of an aqueous polymer solution or dispersion and about 1 to 100 barrels per vertical foot of strata to be treated of an aqueous alkali metal silicate solution or dispersion will provide the required flow restriction. The mixture of components should contain about 25 to 75 parts by weight of an aqueous solution of a polymer and about 75 to 25 parts by weight of an aqueous solution of an alkali metal silicate. Preferably about equal amounts of each component are injected to form the mixture. It is to be understood that the method of this invention is often employed as one step in an overall enhanced oil recovery or other process. Thus, the injection of the compositions of the method of this invention can be preceeded and/or followed by the injection of various other treating fluids or drive fluids such as aqueous polymer solutions, plug-forming solutions and the like.

The invention is further described by the following examples which are illustrative of specific modes of practicing the invention and are not intended as limiting the scope of the invention as defined by the appended claims.

EXAMPLE 1

The two flat end surfaces of a 3 inch long, 4¼ inch diameter cylindrical core from a California well are coated with a fluid plastic which sets to form a solid through which fluid cannot be injected. A 2½ inch long hole having a diameter of 3/16 inch is axially drilled into the top end of the core. The core is vertically mounted in a confining vessel of slightly larger dimensions than the core which confining vessel has a first fluid entry port in the top and a second fluid entry port in the bottom in communication with the annular space between the core and the confining vessel, and a third entry port in the top in communication with a tube the other end of which extends into the confining vessel and into fluid tight engagement with the hole drilled in the core. The permeability of the core to water is 53 millidarcys.

Phase 1: The core is saturated with a synthetic brine made to match the composition of the brine from the California well by flowing the said brine into the confining vessel via the second fluid entry port therein and through the core while pulling a vacuum on the third fluid entry port. The water is then drained from the confining vessel.

Phase 2: The core is saturated with a mineral oil having a viscosity of 45.8 centipoises, the same as the viscosity of the crude oil from the well, by pumping the mineral oil into the confining vessel via the first entry port and allowing it to flow out of the third entry port at a pressure differential of 15 p.s.i.g.

Phase 3: The core is waterflooded to a water/oil ratio of 49 by passing through the core the same synthetic brine as used in Phase 1 using the same procedure as used in Phase 2. A pressure differential of 15 p.s.i.g. is used.

Phase 4: In an attempt to recover additional oil, the core is subjected to a polymer flood by injecting therethrough by the procedures of Phase 2, a pressure differential of 15 p.s.i.g., about 2 pore volumes of an aqueous solution of the above-described synthetic brine containing 0.1 percent by weight of a polyacrylamide marketed by American Cyanamid Company under the trademark Cyanatrol 950-S.

Phase 5: In a further attempt to recover additional oil and control the produced water/oil ratio by restricting fluid flow through or plugging the more permeable channels of the core, there is injected into the core by the procedures of Phase 2 at a flow rate of 0.53 ml/min. and a pressure differential of 15 p.s.i.g., about 1 pore volume of an aqueous solution of the above-described synthetic brine containing 0.1 percent by weight Cyanatrol 950-S polyacrylamide and 0.5 percent by weight of sodium silicate marketed by Philadelphia Quartz Company under the trademark N-brand sodium silicate. The aqueous solution was prepared by adding both the polymer and the sodium silicate to the brine and stirring.

Phase 6: Finally, there is injected into the core a fresh water polymer flood by the procedures of Phase 2 at a pressure differential of 15 p.s.i.g. About 0.7 pore volume of an solution of 0.1 percent by weight Cyanatrol 950-S polyacrylamide in fresh water is injected.

In this Example, each fluid passing through the core in a particular phase is drained from the confining vessel before introducing another fluid in the next Phase. Table I shows the results of this test. It is found that when an aqueous polymer solution is injected (Phase 4) following the waterflood, the water/oil ratio drops sharply and a large amount of additional oil is recovered. However, after 2 pore volumes of aqueous polymer solution have been injected, no additional oil is recovered and the water/oil ratio increases sharply. At this point the method of the instant invention is carried out (Phase 5) by injecting an aqueous solution containing both polyacrylamide and sodium silicate. This treatment recovers a significant amount of additional oil while the water/oil ratio at first increases and then decreases sharply. In Phase 6, a slug of polymer in fresh water recovers still further additional oil before a sharp rise in the water/oil ratio occurs.

TABLE I

RECOVERY OF ADDITIONAL OIL FROM A CYLINDRICAL CORE BY INJECTING AN AQUEOUS SOLUTION CONTAINING POLYACRYLAMIDE AND SODIUM SILICATE

| Phase | Cumulative Fluid Injected (Pore Volume) | Cumulative Oil Recovered (% Oil in Place) | Produced Water/Oil Ratio | Flow Rate (ml/sec) |
|---|---|---|---|---|
| 3 | 0.08 | 6.3 | 0.6 | 0.132 |
| " | 0.115 | 6.75 | 19 | " |
| " | 0.173 | 7.2 | " | 0.137 |
| " | 0.46 | 9 | 24 | 0.134 |
| " | 0.75 | 10.8 | " | 0.128 |
| " | 1.04 | 12.2 | 32.3 | — |
| " | 1.32 | 13.5 | " | — |
| " | 1.61 | 14.4 | 49 | — |
| " | 1.90 | 15.3 | " | 0.121 |
| 4 | 2.07 | 19.8 | 5 | 0.189 |
| " | 2.21 | 23.4 | 5.2 | — |
| " | 2.36 | 27 | " | — |
| " | 2.50 | 29.7 | 7.3 | — |
| " | 2.65 | 32 | 8.6 | — |
| " | 2.79 | 33.8 | 7.7 | — |
| " | 2.93 | 35.8 | 10.4 | — |
| " | 3.08 | 37.6 | 7.7 | — |
| " | 3.22 | 39.4 | " | — |
| " | 3.51 | 40.3 | 49 | — |
| " | 3.80 | 42.1 | 24 | — |
| " | 4.08 | 43.9 | " | 0.169 |
| 5 | 4.37 | 45.7 | 24 | 0.216 |
| " | 4.66 | 47.1 | 32.3 | 0.0154 |
| " | 4.95 | 48.9 | 24 | 0.0111 |
| " | 5.07 | 49.8 | 21 | 0.0089 |
| 6 | 5.35 | 50.7 | 49 | 0.0060 |
| " | 5.73 | 52.9 | 25 | 0.0053 |
| " | 5.88 | 53.8 | 26 | 0.0050 |
| " | 6.17 | 54.3 | 99 | 0.0054 |

EXAMPLE 2

A rectangular core from a California field measuring 3.5 inches × 1.75 inches × 1.25 inches is fitted with a porous disk on each of the two opposite end faces having the smallest surface area. The core contains some reservoir crude oil which has hardened somewhat due to exposure to the atmosphere. The surfaces of the core and the porous disks are then coated with a fluid plastic that sets to form a solid adherent surface impervious to fluid flow. A centralized 0.125 inch diameter hole is drilled into each of the two vertically positioned disk surfaces. The holes are tapped for fluid injection. The permeability of the core to water is 450 millidarcys. Union's fluids are then flowed through the core at the reservoir temperature of 125° F. and a pressure of 5 p.s.i.g.

Phase 1: The hardened crude oil is removed by flowing about 10 pore volumes of kerosene through the core.

Phase 2: About four pore volumes of field crude oil is flowed through the core to saturate the core with crude oil.

Phase 3: The core is water flooded to a high water/oil ratio of 124 by injecting about 5 pore volumes of reservoir water.

Phase 4: In an attempt to recover additional oil, the core is subjected to a polymer flood by injecting therethrough about 1.5 pore volumes of an aqueous solution of 0.1 percent by weight Cyanatrol 950-S polyacrylamide in reservoir water.

Phase 5: In a further attempt to recover additional oil and lower the produced water/oil ratio by restricting fluid flow in the medium to high permeability channels of the core, there is injected into the core about 1.75 pore volumes of an aqueous solution of reservoir brine containing 0.1 percent by weight Cyanatrol 950-S polyacrylamide and 0.5 percent by weight N-brand sodium silicate. The aqueous solution is prepared by adding both the polymer and the sodium silicate to reservoir brine and stirring.

Phase 6: Finally there is injected into the core about 3 pore volumes of the same polymer flood as used in phase 4.

As is shown in Table II, it is found that when an aqueous polymer solution is injected (Phase 4) following the waterflood, the water/oil ratio drops sharply at first but quickly increases again to an undesirably high value. About 5.6 percent additional oil is recovered. When the method of the instant invention is carried out (Phase 5) by injecting an aqueous solution containing both polyacrylamide and sodium silicate, 20.7 percent additional oil is recovered, the water/oil ratio decreases sharply and remains low, but the flow rate undesirably decreases substantially. When another slug of polymer solution is injected (Phase 6), 9.2 percent additional oil is recovered and the flow rate desirably goes up. However, the water/oil ratio undesirably goes up as well. Thus, the greatest amount of additional oil is recovered at a desirably low water/oil ratio using the method of the instant invention.

TABLE II

RECOVERY OF ADDITIONAL OIL FROM A RECTANGULAR CORE BY INJECTING AN AQUEOUS SOLUTION CONTAINING POLYACRYLAMIDE AND SODIUM SILICATE

| Phase | Cumulative Fluid Injected (Pore Volume) | Cumulative Oil Recovered (% Oil in Place) | Produced Water/Oil Ratio | Flow Rate (ml/sec) |
|---|---|---|---|---|
| 3 | 0.32 | 1.8 | 24 | — |
| " | 0.64 | 2.8 | 49 | — |
| " | 0.97 | 3.7 | " | — |
| " | 1.29 | 5.1 | 32 | — |
| " | 2.1 | 7.8 | 41 | — |
| " | 2.9 | 10.1 | 49 | — |
| " | 3.71 | 11.5 | 82 | — |
| " | 4.52 | 12.4 | 124 | 0.247 |
| 4 | 4.84 | 16.1 | 11.5 | — |
| " | 5.16 | 18.9 | 15.7 | — |

TABLE II-continued
RECOVERY OF ADDITIONAL OIL FROM A RECTANGULAR CORE BY INJECTING AN AQUEOUS SOLUTION CONTAINING POLYACRYLAMIDE AND SODIUM SILICATE

| Phase | Cumulative Fluid Injected (Pore Volume) | Cumulative Oil Recovered (% Oil in Place) | Produced Water/Oil Ratio | Flow Rate (ml/sec) |
|---|---|---|---|---|
| " | 5.48 | 20.7 | 24 | — |
| " | 5.81 | 21.7 | 49 | 0.027 |
| 5 | 6.13 | 24.0 | 19 | — |
| " | 6.45 | 30.0 | 6.7 | — |
| " | 6.77 | 35.5 | 7.3 | — |
| " | 7.1 | 40.1 | 9 | — |
| " | 7.42 | 44.7 | " | 0.0023 |
| 6 | 7.74 | 49.3 | 9 | — |
| " | 8.07 | 51.6 | 19 | — |
| " | 8.39 | 53.5 | 24 | — |
| " | 8.71 | 54.4 | 49 | — |
| " | 9.03 | 55.3 | " | — |
| " | 9.36 | 56.2 | " | — |
| " | 9.68 | 57.2 | " | — |
| " | 10.0 | 58.1 | " | — |
| " | 10.32 | 58.5 | 99 | 0.00783 |

EXAMPLE 3

The method for restricting fluid flow through a reservoir is illustrated by the following field example. A California well having a depth of 3,100 feet and penetrating a 200 foot thick oil-containing reservoir is used as an injection well in an enhanced oil recovery process. A well profile shows that a high permeability zone exists near the top of the pay zone. This is believed due, at least in part, to the plugging of the lower part of the pay zone with particulate materials from dirty injection water previously injected. The oil-containing reservoir in the immediate vicinity of the well is cleaned by treating with a slug of acid solution and high pressure steam. The pay zone is then treated with a slug of an aqueous solution of polyacrylamide and a cross-linking agent in accordance with well known procedures in an attempt to plug the upper high permeability zone in the vicinity of the well. The reservoir is then subjected to a polymer flood by injecting 20 percent of the reservoir pore volume of an aqueous solution of a polyacrylamide polymer. The concentration of the polymer in the injected solution is graded, starting with 0.15 weight percent, ending with 0.02 weight percent and averaging 0.08 weight percent polyacrylamide. Periodically an injection profile is run on the well. When the injection profile indicates that the polymer solution is passing through the pay zone in a nonuniform manner, it is necessary to treat the reservoir in an attempt to straighten out the flood front which by now exists out in the reservoir a considerable distance from the injection well bore. Thus, in accordance with the procedures of this invention there are simultaneously injected down the well tubing and into the reservoir 175 barrels of an aqueous solution containing 0.15 weight percent N-Hance 325 partially hydrolyzed anionic polyacrylamide marketed by Cort Company and 175 barrels of an aqueous solution containing 0.5 weight percent N-Brand sodium silicate. These compositions are then followed by an additional volume of an aqueous solution of a polyacrylamide polymer.

The two injected solutions mix while traveling down the well tubing and are injected into and travel through the reservoir. In two months time when the injected mixture is calculated to have traveled about 2,000 feet from the well bore, the mixture is effective in reducing fluid flow through the medium to high permeability channels which it occupies. Thus, subsequently injected polyacrylamide solution is forced into the less permeable channels. The enhanced oil recovery flood fluid front in the reservoir smooths out, fingering is reduced and additional oil is swept toward a production well through which it is produced.

While particular embodiments of the invention have been described, it will be understood that the invention is not limited thereto since many modifications can be made and it is intended to include within the invention any such embodiments as fall within the scope of the claims.

The invention having been thus described, I claim:

1. A method for reducing the permeability of the medium to high permeability strata or channels of a subterranean reservoir having heterogeneous permeability penetrated by a well comprising injecting through said well and into said reservoir:
    (a) about 1 to 100 barrels per vertical foot of strata to be treated of a first composition consisting essentially of an aqueous solution or dispersion of a water-soluble relatively high molecular weight polymer selected from the group consisting of acrylic acid-acrylamide copolymers, terpolymers of acrylamides and substituted acrylamides, polyacrylamides, partially hydrolyzed polyacrylamides, polyalkyleneoxides and heteropolysaccharides obtained by the fermentation of starch-derived sugar, and
    (b) about 1 to 100 barrels per vertical foot of strata to be treated of a second composition consisting essentially of an aqueous solution or dispersion of an alkali metal silicate, such aqueous solutions or dispersions being injected in a manner such that they are mixed in the reservoir.

2. The method defined in claim 1 wherein said water-soluble relatively high molecular weight polymer is employed at a concentration of about 0.001 to 1 percent by weight of the aqueous solution.

3. The method defined in claim 1 wherein said water-soluble relatively high molecular weight polymer is employed at a concentration of about 0.05 to 0.15 percent by weight of the aqueous solution.

4. The method defined in claim 1 wherein said alkali metal silicate is employed at a concentration of about 0.05 to about 5 percent by weight of the aqueous solution.

5. The method defined in claim 1 wherein said alkali metal silicate is employed at a concentration of about 0.1 to 1.5 percent by weight of the aqueous solution.

6. The method defined in claim 1 wherein said alkali metal silicate is sodium silicate.

7. The method defined in claim 1 wherein the aqueous solutions are admixed at the surface prior to injection into the well.

8. The method defined in claim 1 wherein the aqueous solutions are injected sequentially into the well.

9. The method defined in claim 1 wherein the aqueous solutions are injected simultaneously into the well.

10. The method defined in claim 1 wherein the aqueous solution of an alkali metal silicate additionally contains an effective amount of a cellulose ether thickener.

11. The method defined in claim 10 wherein the cellulose ether is hydroxyethylcellulose.

12. The method defined in claim 1 wherein the high to medium permeability strata have a permeability of about 50 to 1,000 milldarcys.

13. The method defined in claim 1 wherein the said aqueous solution or dispersion of a water-soluble relatively high molecular weight polymer and the said aqueous solution or dispersion of an alkali metal silicate are substantially free of a cross-linking agent and a gelling agent.

14. The method defined in claim 1 wherein the reduction in permeability takes place at a distance of about 35 to 100 feet or more from the well.

15. The method defined in claim 1 wherein the reduction in permeability becomes effective from about two weeks in two months or longer after injection into the reservoir.

16. In a method for enhanced oil recovery wherein a drive fluid is injected into a reservoir having heterogeneous permeability via one or more injection wells to displace oil toward one or more production wells, the improvement which comprises reducing the permeability of the medium to high permeability strata or channels of said reservoir by interrupting the injection of the drive fluid to inject into the said injection well and into the said reservoir a slug of about 1 to 100 barrels per vertical foot of strata to be treated of a first composition consisting essentially of an aqueous solution or dispersion of a water-soluble relatively high molecular weight polymer selected from the group consisting of acrylic acid-acrylamide copolymers, terpolymers of acrylamides and substituted acrylamides, polyacrylamides, partially hydrolyzed polyacrylamides, polyalkyleneoxides and heteropolysaccharides obtained by by the fermentation of starch-derived sugar, and about 1 to 100 barrels per vertical foot of a second composition consisting essentially of an aqueous solution on dispersion of an alkali metal silicate, which solutions are substantially free of a cross-linking agent and a gelling agent, which solutions mix and pass through the reservoir to form at a substantial distance from the injection well a fluid flow restricting composition which remains capable of at least limited fluid flow through the reservoir.

17. The method defined in claim 16 wherein said water-soluble relatively high molecular weight polymer is employed at a concentration of about 0.001 to 1 percent by weight of the aqueous solution.

18. The method defined in claim 16 wherein said water-soluble relatively high molecular weight polymer is employed at a concentration of about 0.05 to 0.15 percent by weight of the aqueous solution.

19. The method defined in claim 16 wherein said alkali metal silicate is employed at a concentration of about 0.05 to about 5 percent by weight of the aqueous solution.

20. The method defined in claim 16 wherein said alkali metal silicate is employed at a concentration of about 0.1 to 1.5 percent by weight of the aqueous solution.

21. The method defined in claim 16 wherein said alkali metal silicate is sodium silicate.

22. The method defined in claim 16 wherein the aqueous solutions are admixed at the surface prior to injection into the well.

23. The method defined in claim 16 wherein the aqueous solutions are injected sequentially into the well.

24. The method defined in claim 16 wherein the aqueous solutions are injected simultaneously into the well.

25. The method defined in claim 16 wherein the aqueous solution of an alkali metal silicate additionally contains an effective amount of a cellulose ether thickener.

26. The method defined in claim 25 wherein the cellulose ether is hydroxyethylcellulose.

27. The method defined in claim 16 wherein the high to medium permeability strata have a permeability of about 50 to 1,000 darcys.

28. The method defined in claim 16 wherein the reduction is permeability takes place at a distance of about 35 to 100 feet or more from the well.

29. The method defined in claim 16 wherein the reduction in permeability becomes effective from about two weeks to two months or longer after injection into the reservoir.

* * * * *